United States Patent
Liu et al.

(10) Patent No.: US 12,017,190 B2
(45) Date of Patent: Jun. 25, 2024

(54) COATED COMPOSITE HOLLOW FIBER GAS SEPARATION MEMBRANES WITH IMPROVED PERMEANCE AND SEPARATION LAYER ADHESION

(71) Applicant: L'Air Liquide, Societe Anonyme pour l'Etude et l'Exploitation des Procedes Georges Claude, Paris (FR)

(72) Inventors: Junyi Liu, Newark, DE (US); Sudhir Kulkarni, Wilmington, DE (US); Raja Swaidan, Lincoln University, PA (US); Megha Sharma, Newark, DE (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/962,678

(22) Filed: Oct. 10, 2022

(65) Prior Publication Data
US 2024/0116009 A1    Apr. 11, 2024

(51) Int. Cl.
*B01D 71/58* (2006.01)
*B01D 53/22* (2006.01)
(Continued)

(52) U.S. Cl.
CPC ........... *B01D 71/58* (2013.01); *B01D 53/228* (2013.01); *B01D 63/02* (2013.01); *B01D 69/08* (2013.01);
(Continued)

(58) Field of Classification Search
CPC ........ B01D 39/00; B01D 39/14; B01D 39/16; B01D 39/1607; B01D 39/1692;
(Continued)

(56) References Cited

U.S. PATENT DOCUMENTS 3,874,986 A   4/1975  Browall et al.
4,277,344 A   7/1981  Cadotte
(Continued)

OTHER PUBLICATIONS

Ding et al., PEEK Hollow Fiber Composite Gas Separation Membranes Applied in Minimal Pretreatment and Condensing Environments, Wednesday, May 25, 2016. (Year: 2016).*

(Continued)

*Primary Examiner* — Allison G Fitzsimmons
(74) *Attorney, Agent, or Firm* — Allen E. White; Christopher J. Cronin

(57) ABSTRACT

Composite hollow fiber gas separation membranes with improved permeance and separation layer adhesion are manufactured by providing dipping a hollow fiber membrane substrate in a pre-coat layer coating composition followed by drying to thereby provide a pre-coated substrate and dipping the pre-coated substrate in a separation layer coating composition followed by drying to thereby provide the composite hollow fiber gas separation membranes. The pre-coating composition includes a first polymer dissolved in a first solvent and the separation layer composition includes a second polymer dissolved in a second solvent. The first and second polymers are the same or different, each of the first and second polymers is at least 1 wt % soluble in a same third solvent, the first and second solvents are the same or different, the first and third solvents are the same or different, and the second and third solvent are the same or different.

20 Claims, 4 Drawing Sheets

(51) Int. Cl.
*B01D 63/02* (2006.01)
*B01D 69/08* (2006.01)

(52) U.S. Cl.
CPC .. *B01D 2325/0233* (2022.08); *B01D 2325/20* (2013.01)

(58) Field of Classification Search
CPC .... B01D 61/00; B01D 61/145; B01D 61/147; B01D 61/16; B01D 61/18; B01D 61/36; B01D 61/364; B01D 61/366; B01D 63/00; B01D 63/02; B01D 63/021; B01D 63/022; B01D 67/00; B01D 67/0002; B01D 67/006; B01D 2323/00; B01D 2323/12; B01D 2323/15; B01D 2323/40
USPC .......................................... 210/500.1, 500.23
See application file for complete search history.

(56) References Cited

U.S. PATENT DOCUMENTS

| | | | |
|---|---|---|---|
| 4,602,922 | A | 7/1986 | Cabasso et al. |
| 5,286,280 | A | 2/1994 | Chiou |
| 5,324,430 | A * | 6/1994 | Chung .................. B01D 69/08 |
| | | | 210/500.43 |
| 6,887,408 | B2 | 5/2005 | Yuan |
| 7,176,273 | B2 | 2/2007 | Yuan et al. |
| 7,368,526 | B2 | 5/2008 | Yuan et al. |
| 9,731,248 | B2 | 8/2017 | Umehara et al. |
| 10,005,043 | B2 | 6/2018 | Umehara et al. |
| 10,500,548 | B2 | 12/2019 | Koros et al. |
| 10,596,527 | B2 | 3/2020 | Shangguan et al. |

| | | | |
|---|---|---|---|
| 2004/0050250 | A1 * | 3/2004 | Pinnau ................. B01D 53/228 |
| | | | 95/45 |
| 2016/0256833 | A1 | 9/2016 | Itoh et al. |
| 2018/0178169 | A1 | 6/2018 | Yoneyama et al. |

OTHER PUBLICATIONS

Peter et al., Multilayer composite membranes for gas separation based on crosslinked PTMSP gutter layer and partially crosslinked Matrimid® 5218 selective layer In: Journal of Membrane Science (2009) Elsevier (Year: 2009).*

Fouda, A. et al., Wheatstone bridge model for laminated polydimethylsiloxane membrane for gas separation, J. Membrane Sci., 64 (1991) 263-271.

Karode, S.K. et al., An improved model incorporating constriction resistance in transport through thin film composite membranes, J. Membrane Sci., 114 (1996) 157-170.

Kattula, M. et al., Designing ultrathin film composite membranes: the impact of a gutter layer, Sci. Rep. 5, 15016 (2015.

Lazar M. et al., Silicone based membranes for organic solvent nanofiltration, PhD diss., Universitätsbibliothek der RWTH Aachen, 2015, 183 pages.

Liang, C.Z. et al., A review of polymeric composite membranes for gas separation and energy production. Progress in Polymer Science 97 (2019): 101141.

Peterson, R.J. et al., Composite reverse osmosis and nanofiltration membranes, J. Membr. Sci. 1993 83 81-150.

Yoo, M.J. et al., Ultrathin gutter layer for high-performance thin-film composite membranes for $CO_2$ separation, Journal of Membrane Science 566 (2018) 336-345.

Zhang, C. et al., Ultra-thin skin carbon hollow fiber membranes for sustainable molecular separations. AlChE Journal, 2019 65(8), e16611.

* cited by examiner

COATED COMPOSITE HOLLOW FIBER GAS SEPARATION MEMBRANES WITH IMPROVED PERMEANCE AND SEPARATION LAYER ADHESION

CROSS-REFERENCE TO RELATED APPLICATIONS

None.

BACKGROUND

Field of the Invention

The invention relates to composite hollow fiber gas separation membranes.

Related Art

Thin-film composite membranes, typically fabricated by dip-coating, interfacial polymerization, co-extrusion are commercially important due to their low manufacturing cost, strong mechanical properties, and a high permeance. Permeance represents the ability of a species to penetrate and permeate a membrane of a specific thickness and is expressed in gas permeation units (GPU) where:

$$1 \text{ GPU} = 1 \times 10^{-6} \cdot \text{cm}^3 \text{ (STP)/cm}^2 \cdot \text{cmHg} \cdot \text{sec}.$$

Such membranes have selective layer, made of a material having a high selectivity for the gases of interest, which is coated on top of a relatively non-selective porous support.

A traditional approach for increasing permeance of composite membranes is to decrease the selective layer thickness. For composite hollow fiber membranes, the selective layer thickness can be decreased by reducing the solids content of the coating solution. However, as the coating thickness decreases, the coating will tend to be no longer able to bridge pores formed in the outer surface of the support and result in an unsatisfactory selectivity caused by channeling of the feed gas through uncovered pores. Moreover, other mass transfer resistances such as pores filled with the coating (as opposed to being bridged by the coating) or constriction resistance become rate controlling. Constriction resistance (Fouda et al, "Wheatstone bridge model for laminated polydimethylsiloxane/polyethersulfone membrane for gas separation", J. Membrane Sci., 64 (1991) 263-271; and Karode, et al, "An improved model incorporating constriction resistance in transport through thin film composite membranes", J. Membrane Sci., 114 (1996) 157-170), which is also called geometric resistance (Kattula, et al, "Designing ultrathin film composite membranes: the impact of a gutter layer". Sci. Rep. 5, 15016 (2015)) is the increased length of the diffusion path of the permeating species caused by the finite number of pores in the composite substrate layer. The coating thickness in industrially relevant composite membranes needs to be small; however, as the coating thickness decreases, the radial flow to the few substrate pores becomes increasingly important. As a result, the effective diffusion path length is increased and the composite permeance is correspondingly decreased.

An alternate approach first proposed by U.S. Pat. No. 4,602,922 is to deposit a highly permeable layer called a gutter layer between the support and selective layer in order to increase gas permeance through the composite membrane. The gutter layer can help to prevent pore penetration into the support of the lower permeability top coating and decrease the constriction resistance through the coating layer. In other words, the pathway of the permeating gas goes through the portion of the selective layer on top of the gutter layer and then through the gutter layer into open pores on the surface of the support.

The ideal gutter layer should exhibit: a) typically high intrinsic permeability for the desired permeating gas, b) good adhesion to both the underlying porous support and the overlying selective layer, c) the ability to be coated by a process and with solvents that do not damage the microporosity of the underlying substrate, and d) the ability to withstand the process/solvents used in subsequent coating of the active/selective layer.

Few materials can be found to meet all these criteria. Hence, while theoretically attractive, the gutter layer concept is not widely used industrially.

Conventional gutter layers are typically based upon siloxane due to its high permeance. In order to avoid dissolution of the gutter layer when coating the selective layer upon the membrane, the siloxane gutter layer is typically mostly cross-linked before coating the selective layer on top of the gutter layer.

The patent literature includes various proposals for coating gutter layers.

U.S. Pat. No. 4,602,922 discloses an aminosiloxane polymer gutter layer that is cross-linked via diisocyanate chemistry. The cross-linked aminosiloxane composite is proposed to be used as is or further coated with a higher selectivity selective layer, such as poly-phenylene oxide. The cross-linking protects the gutter layer from the solvent(s) of the selective layer coating composition. This aminosiloxane chemistry of the gutter layer also benefits adhesion with the active layer. U.S. Pat. No. 4,602,922 does not disclose gutter and selective layers of a similar polymer type which can be sequentially coated by solvents of a similar chemical type without any intermediate crosslinking.

U.S. Pat. No. 5,286,280 discloses a composite gas separation membrane with a porous polyacrylonitrile support material. A gutter layer coating made of a cross-linked polar phenyl-containing-organopolysiloxane material overlies the polyacrylonitrile support material. An ultrathin 6FDA type polyimide selective membrane layer is coated on the gutter layer surface. It describes several coating solvent requirements that subsequent gutter layer solutions typically follow. It states that the solvent must dissolve the selective polymer so that an ultrathin film can be coated onto the gutter layer, this solvent must not attack the gutter layer, and this solvent should have a relatively low surface tension during the coating process for the 6FDA-polyimide layer. The low surface tension of the solvent is described as being very important in order to allow uniform ultrathin coating formation over the gutter layer. It recites the following solvents as being preferable for dissolving 6FDA-polyimides: acetone, methyl ethyl ketone, and dioxolane. It infers that methylene chloride and tetrahydrofuran are not preferred because of their tendency to attack the gutter layer.

U.S. Pat. No. 10,596,527 describes amorphous fluoropolymer membranes made with selective/active layer compositions which are copolymers of perfluoro-2,2-dimethyl-1,3 dioxole (PDD) copolymerized with an alkylvinyl ester such as vinyl acetate, and vinyl pivalate, and with alkylvinyl esters that are substantially hydrolyzed to provide copolymerized vinyl alcohol functionality. The membranes are described as having a thin, high diffusion rate and a gutter layer of a fluorinated polymer highly permeable to nitrogen that is positioned between the active layer and a porous support layer. The gutter layer is a fluorinated polymer with dioxole monomers (PDD). U.S. Pat. No. 10,596,527 does not disclose chemically similar selective and gutter layers or chemically similar solvents for the selective and gutter layers. The active layer contains polar alkyl ester/ether groups while the gutter layer is a perfluorinated polymer. Consequently, the gutter layer is coated using a perfluorinated solvent while the active layer is coated using methanol.

U.S. Pat. No. 10,005,043 discloses a membrane having a porous support, a gutter layer, and a discriminating layer; wherein the discriminating layer comprises a polyimide, cellulose acetate, polyethylene oxide or polyetherimide and wherein at least 10% of the discriminating layer is intermixed with the gutter layer. The gutter layer, which is silicone-based, and the active layer are chemically different. The degree of intermixing is controlled by either the exposure time before radiation curing, or for meniscus coatings, by varying the ratio of good/poor solvents (e.g., THF/MEK) during the active layer coating. The silicone gutter layer is cross-linked/cured so that it is no longer soluble.

US 20160256833 discloses a composite gas membrane including a porous support, an activated gutter layer, a discriminating layer located on the gutter layer, and an optionally a protective layer on the discriminating layer. It addresses the compatibility/adhesion issues experienced when coating the type of composite membranes that are the focus of US 20160256833. It discloses that the layers remain in place when a peeling force of 2.5 N/1. 5 cm is applied. It describes that the adhesion is achieved by a gutter layer that has been activated by a corona treatment, plasma treatment, flame treatment, and/or ozone treatment. Therefore, US 20160256833 does not disclose the use of a gutter layer without surface treatment of the gutter layer by corona, plasma, flame, or ozone.

SUMMARY OF THE INVENTION

An aim of the invention is to overcome all or some of the disadvantages stated above with regard to conventional gas separation membrane modules.

Towards this end, there is disclosed a process for manufacturing a composite hollow fiber membrane with improved permeance and separation layer adhesion. It comprises the following steps. A hollow fiber membrane support is provided. The hollow fiber membrane support is dipped in a precoat layer coating composition that comprises a first polymer dissolved in a first solvent to thereby provide a pre-coated hollow fiber membrane support. The pre-coated hollow fiber membrane support is dried to thereby provide a dried pre-coated hollow fiber membrane support. The dried pre-coated hollow fiber membrane support is dipped in a selective layer coating composition that comprises a second polymer dissolved in a second solvent to thereby provide the composite hollow fiber membrane with improved permeance and separation layer adhesion. In between the dipping of the hollow fiber membrane support in the precoating layer coating composition and the dipping of the dried pre-coated hollow fiber membrane support, the dried precoating laying coating composition is not cross-linked. The first and second polymers are the same or different. Each of said first and second polymers is at least 1 wt % soluble in a same third solvent. The first and second solvents are the same or different. The first and third solvents are the same or different. The second and third solvent are the same or different.

There is also disclosed the composite hollow fiber membrane that is produced by above-mentioned method.

The method and/or composite hollow fiber membrane may include one or more of the following aspects:
- the precoat layer coating composition essentially consists of a first polymer dissolved in a first solvent to thereby provide a pre-coated hollow fiber membrane support.
- the first polymer is present in the precoat layer coating composition at a concentration of no more than 0.50 wt %.
- the first polymer is present in the precoat layer coating composition at a concentration of no more than 0.20 wt %.
- the first polymer is present in the precoat layer coating composition at a concentration of no more than 0.10 wt %.
- the first and second solvents are miscible in one another.
- the first and second polymers are the same polymer and the first and second solvents are the same.
- the first and second polymers are the same polymer the first solvent is different from the second solvent.
- the first polymer is different from the second polymer and the first and second solvents are the same.
- the first polymer is different from the second polymer and the first solvent is different from the second solvent.
- the hollow fiber membrane support is comprised of a material selected from polyether ketone (PEK) and polyether ether ketone (PEEK).
- said steps of dipping the hollow fiber membrane support, drying the pre-coated hollow fiber membrane support, and dipping the dried pre-coated hollow fiber membrane support are performed continuously.
- said step of drying the pre-coated hollow fiber membrane support is performed by traversing the pre-coated hollow fiber membrane support through a drying tower through which a drying gas flows at a temperature of 30-180° C.
- the first polymer is selected from polyimides, perfluorinated polymers, polymers of intrinsic morphology (PIMs), substituted polyacetylenes, and polyether-block-copolymers.
- first polymer is selected from: copolymers of 2,2'-Bis-(3, 4-Dicarboxyphenyl) hexafluoropropane dianhydride and 2,3,5,6-tetramethyl-phenylene diamine;
- copolymers of the dianhydrides 2,2'-Bis-(3,4-Dicarboxyphenyl) hexafluoropropane dianhydride and 3,3',4,4'-Biphenyl tetracarboxylic dianhydride and 2,4.6-trimethyl-I,3-phenylene diamine; copolymers of 2,2-bis-trifluoromethyl-4,5-difluoro-1,3-dioxole and tetrafluoroethylene, polyether block copolymers (such as polyether block-amide copolymers), polytrimethyl silyl propyne, and polymethyl pentene.
- the second polymer is selected from polyimides, perfluoropolymers, sulfonated polysulfone, polycarbonates, polypyrroles, polymers of intrinsic microporosity, and polyether-block copolymers.
- the second polymer is selected from poly(tetrafluoroethylene-co-2,2,4-trifluoro-5-trifluoromethoxy-1,3-dioxole) and poly(perfluoro-4-vinyloxy-1-butene).
- immediately after said step of dipping the dried pre-coated hollow fiber membrane support is performed, the composite hollow fiber membrane is dried traversing it through a drying tower through which a drying gas flows at a temperature of 30-180° C.
- a residence time of the dried pre-coated hollow fiber membrane support in the selective layer coating composition is 0.2-5.0 sec.

a residence time of the dried pre-coated hollow fiber membrane support in the selective layer coating composition is 1-4 sec.

the first and second polymers are the same polymer except that a molecular weight of the first polymer is greater than a molecular weight of the second polymer.

the second polymer is at least 1 wt % soluble in the first solvent.

the first polymer is at least 1 wt % soluble in the second solvent.

BRIEF DESCRIPTION OF THE FIGURES

Other characteristic features and advantages will emerge upon reading the following description, with reference to the figures in which.

DETAILED DESCRIPTION OF THE INVENTION

Figure 1:
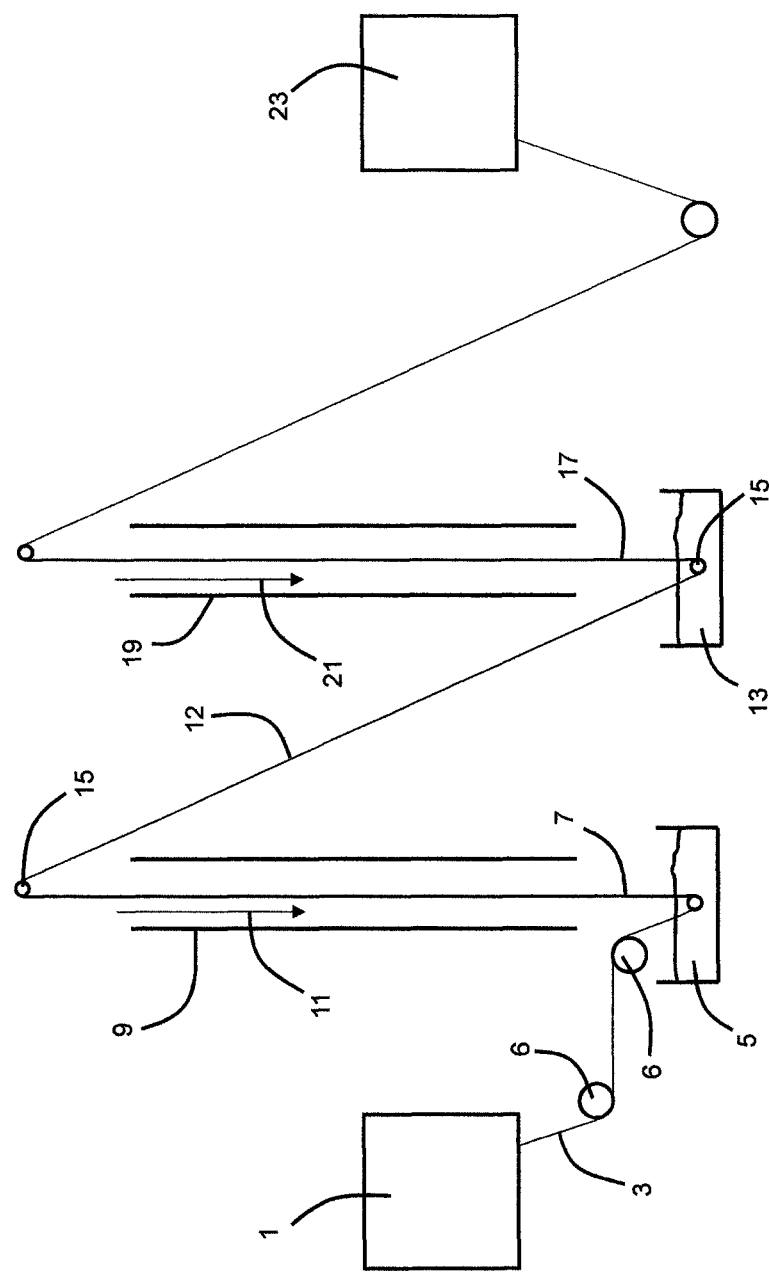
FIG. 1 is schematic view of an embodiment of the inventive method.

In contrast to conventional composite hollow fiber membrane manufacturing techniques that crosslink the gutter layer before dipping the gutter layer-coated support in the coating composition for the selective layer, and/or use solvents for the gutter layer and the selective layer that are relatively immiscible in one another, and/or use chemically dissimilar materials for the gutter layer and selective layer, we propose a composite hollow fiber membrane having a pre-coat layer that is not crosslinked before over-coating it with the selective layer and which is chemically similar to the material of the selective layer.

Because chemically similar is not a sufficiently specific term, we use solubility as a proxy for chemical similarity. More particularly, while the polymeric material of the pre-coat layer may be the same as or different from that of the selective layer, and the solvents used for the pre-coat layer and the selective layer may also be the same or different, the polymeric material of the pre-coat layer and the polymeric material of the selective layer must each be at least 1 wt % soluble in a same solvent.

To break this down further, consider the following examples illustrating this. First, the polymeric material used for the pre-coat layer may be the same as the polymeric material used for the selective layer and the solvent used for coating the pre-coat layer may be the same as the solvent used for coating the selective layer. Second, the polymeric material used for the pre-coat layer may be the same as the polymeric material used for the selective layer and the solvent used for coating the pre-coat layer may be different from the solvent used for coating the selective layer. Third, the polymeric material used for the pre-coat layer may be different from the polymeric material used for the selective layer, but the solvent used for coating the pre-coat layer may be the same as the solvent used for pre-coating the selective layer. And fourth, the polymeric material used for the pre-coat layer may again be different from the polymeric material used for the selective layer, but the solvent used for coating the pre-coat layer may be different from the solvent used for coating the selective layer. In the third and fourth examples, the chemical similarity of the material used for coating the pre-coat layer is expressed in terms of solubility: each of the aforementioned different materials must be at least 1 wt % soluble in a third solvent, where the third solvent may be the same as or different from either the solvent used for the pre-coat layer or the solvent used for the selective layer. Typically, the solvents used for coating the pre-coat layer and for coating the selective layer are miscible in each other.

The support fiber may be comprised of any material known for use as such in the field of composite hollow fiber membranes. Typically, the support is polyether ketone (PEK), or polyether ether ketone (PEEK) made by one of the processes of U.S. Pat. Nos. 6,887,408, 7,176,273, and 7,368,526.

The polymeric material for use in the pre-coat layer is selected to have a relatively high permeance, such as polyimides, perfluorinated polymers, polymers of intrinsic morphology (PIMs), substituted polyacetylenes, and polyether-block-copolymers. Specific examples of polymeric materials include 6FDA-durene, 6FDA:BPDA-DAM, copolymers of 2,2-bis-trifluoromethyl-4,5-difluoro-1,3-dioxole and tetrafluoroethylene (such as Teflon AF 2400), polytrimethyl silyl propyne (PTMSP), and polymethyl pentene. 6FDA-durene is polymerized from stoichiometric amounts of 2,2'-Bis-(3,4-Dicarboxyphenyl) hexafluoropropane dianhydride and 2,3,5,6-tetramethyl-phenylene diamine. 6FDA:BPDA-DAM is polymerized from stoichiometric amounts of the dianhydrides 2,2'-Bis-(3,4-Dicarboxyphenyl) hexafluoropropane dianhydride and 3,3',4,4'-Biphenyl tetra-carboxylic dianhydride and the diamine 2,4.6-trimethyl-I,3-phenylene. Teflon AF 2400 and Teflon AF 1600 are types of poly(tetrafluoroethylene-co-[2,2-bis-trifluoromethyl-4,5-difluoro-1,3-dioxole]). The composition for coating the pre-coat layer includes but is not necessarily limited to one or more polymers (i.e., the polymeric material) and a solvent. The particular solvent selected is of course driven by which polymeric material is selected for the pre-coat layer and will depend upon whether it is a satisfactory solvent for that polymeric material. Typical solvents include acetone, butanol, dioxolane, dioxane, tetrahydrofuran, methylene chloride, dichloroethane, N,N-Dimethylformamide, and N-Methyl-2-pyrrolidone. Perfluoropolymers are soluble in fluorosolvents such as perfluorooctane and commercially available fluorosolvents or fluorosolvent blends from 3M Company, Chemours, and Solvay.

The pre-coated hollow fiber support may be manufactured either continuously or portions of the manufacturing process may be performed in a continuous manner. For example, the hollow fiber support may be manufactured and stored until there is a need for it to be coated with the pre-coat layer. Typically, the process for application of the pre-coat layer to the hollow fiber support, for drying the pre-coated hollow fiber support, and for application of the selective layer to the pre-coated hollow fiber support is continuous. Thus, the hollow fiber support continuously runs from a collection device, such as a spool or bin, to a coating bath for coating the pre-coat layer, optionally through a drying tower, to a coating bath for coating the selective layer, optionally through another drying tower, and onto another collection device such as a spool or bin.

The pre-coat layer may be applied to the hollow fiber support by continuously running it through a bath that contains the composition for coating the pre-coat layer. The pre-coat layer is substantially or fully dried through volatilization of the solvent as the pre-coated hollow fiber support travels from the pre-coat bath to the selective layer bat. Optionally, substantial or full drying of the pre-coated hollow fiber support is aided by the use of a drying gas in a drying tower. A flow of the drying gas is created within the tower with a mechanical device such as a blower and is directed either counter-current to, co-current to, or perpendicular to, the direction of the moving pre-coated hollow fiber support.

The polymeric material for use in the selective layer will depend upon the desired gas mixture separation because it of course will need to exhibit a suitable perm-selectivity for the fast gas of interest to the slow gas of interest. For example, if the gas mixture to be separated includes CO2 and CH4, the selective layer will be made from polymers having a $CO_2/CH_4$ selectivity >10. Typical examples, well known to practitioners, include polyimides, perfluoropolymers (such as Hyflon or Cytop), sulfonated polysulfone, polycarbonates, polypyrroles, PIMs and polyether block-amide copolymers. Polyimides are synthesized from stoichiometric ratios of one or more dianhydrides and one or more diamines. Particular types of dianhydrides in suitable polyimides include 6FDA (i.e., 2,2'-Bis-(3,4-Dicarboxyphenyl) hexafluoropropane dianhydride) and BPDA (3,3',4,4'-Biphenyl tetracarboxylic dianhydride). Particular types of diamines in suitable polyimides include DAM (2,4.6-trimethyl-I,3-phenylene diamine) and HAB (3,3'-Dihydroxy-4,4'-diamino-biphenyl). The chemical name for Hyflon is poly(tetrafluoroethylene-co-[2,2,4-trifluoro-5-trifluoromethoxy-1,3-dioxole]). The chemical name for Teflon AF is poly(tetrafluoroethylene-co-[2,2-bis-trifluoromethyl-4,5-difluoro-1,3-dioxole)]. Cytop is believed to be mainly poly(perfluoro-4-vinyloxy-1-butene). Polyether-block-amide copolymers are sold under the trade name of PEBAX.

The selective layer may be applied to the pre-coated hollow fiber support by continuously running it through a bath that contains the composition for coating the selective layer. The selective layer is substantially or fully dried through volatilization of the solvent as the composite hollow fiber travels from the coating bath to a collection device such as a spool or bin. Optionally, substantial or full drying of the composite hollow fiber is aided by the use of a drying gas. A flow of the drying gas created with a blower is directed counter-current to co-current to, or perpendicular to the direction of the moving composite hollow fiber.

We disclose a few techniques for avoiding the dissolution of the polymeric material of the pre-coat layer during the coating of the selective layer.

One technique is to control the conditions associated with drying the pre-coat layer before over-coating it with the selective layer. While the solvent used for coating the pre-coat layer is typically fully evaporated when the selective layer is over-coated on the pre-coated support, there may be some residual solvent left but the pre-coat layer is substantially in the solid phase. One of ordinary skill in the art will recognize that the completion of drying of the pre-coat (or at least a satisfactory degree of completion of drying) will depend upon the percent solids in the coating composition for coating the pre-coat layer, the drying temperature, the volatility (i.e., the vapor pressure) of the solvent of the pre-coat, and if present, the velocity of any drying gas. Generally speaking, the drying temperature is typically 30-180° C. Any relative inert gas may be used as a drying gas, such as air, or if in an enclosed system, carbon dioxide or nitrogen. Typically, the flow rate of the drying gas is 1-20 scfm. If, at the time the composite hollow fiber membrane is plunged into the coating bath for the selective layer, the degree of drying of the pre-coat layer is unsatisfactory, the solids content may be decreased, the drying time may be increased, the drying temperature may be increased, and/or the flow rate of the drying gas may be increased.

Another technique is to control the residence time of the dried pre-coated hollow fiber support in the coating bath of the coating composition for the selective layer. One of ordinary skill in the art will recognize that the linear speed of the pre-coated composite hollow fiber membrane may be increased or decreased to achieve a desired residence time. Typically, the linear speed ranges from 1-100 ft/min and particular linear speeds include about 3-30 ft/min. They will further recognize that an unsatisfactory degree of dissolution of the pre-coat layer (that occurs while the pre-coated hollow fiber membrane traverses the coating bath of the coating composition for the selective layer) may be decreased by decreasing the residence time in the coating bath. Typically, the linear speed of the pre-coated hollow fiber support is controlled so as to result in a residence time of 0.2-5.0 sec, more typically 1-4 sec. Thus, if the pre-coat layer is damaged due to unsatisfactorily high degree of dissolution of the pre-coat layer while in the coating bath for the selective layer, the linear speed may be increased. Conversely, if the thickness of the selective layer is non-uniform and unsatisfactorily thin on portions of the pre-coated support, or if the coating solvents are not sufficiently volatilized in the drying towers, the linear speed may be decreased.

Another technique is to increase the molecular weight of the polymeric material of the pre-coat layer. For example, polymerization of the 6FDA-BPDA+DAM polyimide resulting in a relatively higher molecular weight product may be used for the pre-coat layer while polymerization of the same polyimide resulting in a relatively lower molecular weight product may be used for the selective layer. Any technique known in the field of polymerization may be employed to achieve a satisfactorily high enough molecular weight. One of ordinary skill in the art will recognize that a relatively higher molecular weight polymeric material will exhibit greater resistance and longer time for dissolution than a relatively lower molecular weight polymeric material. Thus, if the pre-coat layer becomes damaged due to unsatisfactorily high degree of dissolution of the pre-coat layer while in the coating bath for the selective layer, the molecular weight of the polymer used for the pre-coat layer may be increased. Polymer molecular weights are conveniently measured in a laboratory using gel permeation chromatography.

We have surprisingly found that, by controlling the conditions associated with drying the pre-coat layer before over-coating it with the selective layer, controlling the residence time of the dried pre-coated hollow fiber support in the coating bath of the coating composition for the selective layer, and/or increasing the molecular weight of the polymeric material of the pre-coat layer, we are able to utilize a same solvent or similar solvents for the pre-coat and selective layers. This is completely counterintuitive to conventional teachings in the field of composite hollow fiber gas separation membranes. Conventional thought dictates the use of a selective layer solvent that will not attack (i.e., dissolve) the already-formed gutter layer that is coated on the fiber support. The reasoning behind such conventional thought is that the gutter layer will be substantially dissolved by coating the selective layer with a same or similar solvent.

We will now describe a particular embodiment of a system for manufacturing the inventive composite hollow fiber membrane. As best shown in FIG. 1, the system includes a fiber spool 1 loaded with the hollow fiber support. The hollow fiber support 3 travels from the spool 1 to a coating bath 5 containing a composition for coating the pre-coat layer via rollers 6. After emerging from the coating bath 5, the now pre-coated support fiber 7 traverses through a first drying tower 9 in counter-current to a flow 11 of a drying gas. The substantially or fully dried pre-coated support fiber 12 travels through a coating bath 13 containing a composition for coating the selective layer via rollers 15. After emerging from the coating bath 13, the now composite hollow fiber 17 traverses through a second drying tower 19 in counter-current to a flow 21 of a drying gas. The composite hollow fiber 17 is then collected onto a fiber spool 23.

EXAMPLES

Several different pre-coating solutions were made and their compositions are detailed in Table 1.

TABLE 1 pre-coat layer coating solutions compositions

| No. | Polymer | Solvent |
|---|---|---|
| P1 | 0.2% 6FDA:BPDA-DAM | 1,3 dioxolane |
| P2 | 0.2% AF 2400 | PF-5058 |

Each of the pre-coating solutions were made in the following manner. 0.2 g of the polymer is mixed with 99.8 g 1,3 dioxolane in a glass jar to make a 0.2% solution. The jar was then sealed and rolled on the roller for 12 hours to obtain a homogenous solution. If there is a lag time in between preparation and use of the pre-coating solution, it may be rolled another half an hour before it is coated upon the hollow fiber support.

Several different coating solutions were made and their compositions are detailed in Table 2.

TABLE 2 selective layer coating solutions compositions

| No. | Polymer | Solvent |
|---|---|---|
| C1 | 2% 6FDA:HAB-DAM | 1,3 dioxolane |
| C2 | 2% 6FDA:BPDA-DAM | 1,3 dioxolane |
| C3 | 2% 6FDA:BPDA-DAM | 1,4 dioxolane |
| C4 | 2% 60:40 Hyflon AD 60: Teflon AF1600 blend | PF-5058 |
| C5 | 2% Hyflon AD 60 | PF-5058 |

Each of the coating solutions was made in the following manner. 2 g of the polymer was mixed with 98 g of the solvent in a glass jar to make a 2% solution. The jar was then sealed and rolled on the roller for 12 hours to obtain a homogenous solution. If there is a lag time in between preparation and use of the pre-coating solution, it may be rolled another half an hour before it is coated upon the hollow fiber support.

In each of the Examples and Comparative Examples, the hollow fiber supports are made of PEEK made according to the processes disclosed by U.S. Pat. Nos. 6,887,408, 7,176,273, and 7,368,526. Such hollow fiber supports are porous, including pores at the surface of the fiber.

The advantages of the invention are illustrated in four comparisons of an example with a comparative example.

Comparative Example 1: Composite Membrane Fabrication and Testing of Polyimide 6FDA:HAB-DAM (C1) Coated on PEEK This Comparative Example describes the conventional coating of polyimide 6FDA:HAB-DAM upon PEEK hollow fiber substrate. The coating solution formulation was 2% 6FDA:HAB-DAM in 1,3 dioxolane (C1 formulation) solvent. This C1 solution was coated directly on PEEK fiber without any pre-coat using the system illustrated in FIG. 1. A drying gas of air to each 4" diameter insulated drying tower was established at a flow rate of 1.5 std ft$^3$/min. The air was heated with an inline pipe heater to 80° C. Additional heating of the coated hollow fiber substrate was provided through surface heating of the insulated towers to 80° C. The PEEK Fibers went through drying tower 1 without any coating solution and went through drying tower 2 at 80° C. with C1 coating solution only. The residence time in the C1 coating bath (a beaker was used) was 3 sec. A mini-permeator containing 10 filaments of the C1-coated fibers was post-treated with 0.5% Sylgard 2577 before pure gas permeance measurements were taken.

Example 1: Composite Membrane Fabrication and Testing of 6FDA-BPDA:DAM (P1)+6FDA:HAB-DAM (C1) Polyimide Coating on Pre-Coated PEEK Fiber This Example demonstrates an increase in permeance seen with the pre-coating technique of the invention where both the pre-coat and selective layers are polyimide polymers soluble in the same solvent. In this example, PEEK fiber was first pre-coated with a 0.2% solution of the high permeability polyimide 6FDA-BPDA+DAM in 1,3 dioxolane (formulation P1) and then subsequently coated with the C1 (2% 6FDA:HAB-DAM in the same solvent) coating to create the selective layer. The 0.2% P-1 pre-coating solution was first coated on poly(ether ether ketone) (PEEK) porous hollow fiber by dip coating. The pre-coated fibers were dried at 80° C. for 2 minutes and then further dried at room temperature for another 2 minutes to remove the solvent. The dried pre-coated fibers were dip-coated in C1 solution with a residence time of 3 sec. These P1+C1 coated fibers were also dried at 80° C. and room temperature for 2 minutes, respectively. The resulting fibers were dried at room temperature overnight before use. A mini-permeator containing 10 filaments was post-treated with 0.5% Sylgard 2577 before pure gas permeance measurements were taken. Table 3 summarizes the pure gas permeance of the Comparative Example 1 mini permeator and the Example 1 mini permeator at a pressure of 100 psig and at room temperature.

TABLE 3

Pure gas permeance of Comparative Example 1 and Example 1 samples produced with the same solvent.

| | Gas permeance (GPU) | | Gas selectivity |
|---|---|---|---|
| | $N_2$ | $CO_2$ | $CO_2/N_2$ |
| Comparative Example 1 | 0.094 | 3.5 | 37 |
| Example 1 | 0.13 | 5 | 38 |
| Comparative Example 1 | 0.094 | 3.5 | 37 |
| Example 1 | 0.13 | 5 | 38 |

This example demonstrates that two polymers can be dissolved in the same solvent and applied in two 2 sequential coating layers with an increase in permeance compared to the conventional single coating method. Indeed, the invention results in a permeance increase of 38% for N2, and 30% for $CO_2$ while at least maintaining $CO_2/N_2$ selectivity. Further experiments were done to show that the pre-coat layer in this example is not an integral gutter layer described in prior art literature. A porous fiber support of PEEK was pre-coated with varying concentrations of the high permeability polyimide 6FDA-BPDA+DAM and 1,3 dioxolane. The various pre-coated fibers were then coated with the C1 (2% 6FDA:HAB-DAM in the same solvent) formulation. Permeators were formed with the uncoated hollow fiber support, the pre-coated hollow fiber supports, and the pre-coated hollow fiber supports overcoated with the C1 selective layer. $CO_2$ permeance and $CO_2/N_2$ selectivity were obtained for each of the permeators.

TABLE 4

Perm-selectivity of uncoated hollow fiber support, pre-coated hollow fiber support, and pre-coated hollow fiber support overcoated with a selective layer of 2% 6FDA:HAB-DAM (C1) with varying concentrations of 6FDA-BPDA + DAM in the pre-coat solution

| Pre-coat concentration of 6FDA-BPDA + DAM in 1,3 dioxolane (% wt) | Uncoated hollow fiber support | | Hollow fiber support directly overcoated with C1 selective layer | | Pre-coated hollow fiber support | | Pre-coated hollow fiber support overcoated with C1 selective layer | |
|---|---|---|---|---|---|---|---|---|
| | $CO_2$ GPU | $CO_2/N_2$ | $CO_2$ GPU | $CO_2/N_2$ | $CO_2$ GPU | $CO_2/N_2$ | $CO_2$ GPU | $CO_2/N_2$ |
| No pre-coat | 2100 | 0.9 | 3.5 | 37 | — | — | — | — |
| 0.1% | | | | | 661 | 7 | 18 | 11 |
| 0.2% | | | | | 321 | 11 | 5 | 38 |
| 0.5% | | | | | 42 | 15 | 4 | 40 |
| 2% | | | | | 33 | 31 | | |
| 4% | | | | | 6 | 27 | | |

The selectivity results for the permeators whose fibers are only coated with 6FDA-BPDA+DAM show that integral pre-coat layers with full selectivity are achieved only for pre-coat concentrations >0.5%. In other words, the selectivity of permeators whose hollow support fibers are coated with 2 wt % or 4 wt % compositions of 6FDA-BPDA+DAM in 1,3 dioxolane exhibit the full selectivity expected for an integral layer (i.e., one that covers the entire surface of the hollow support fiber) because the selectivities of the fibers only coated with 2-4% 6FDA-BPDA+DAM match the intrinsic selectivity observed for dense films of this particular polymer.

In contrast, the selectivity of permeators whose hollow support fibers are coated up to 0.5 wt % compositions of 6FDA-BPDA+DAM in 1,3 dioxolane do not exhibit that full selectivity. This demonstrates that pre-coat layers which are coated on hollow fiber supports from low solids (i.e., no more than 0.5 wt % solids) pre-coat coating composition are not integral and must have many discontinuities that significantly lower the overall selectivities exhibited by the permeators. At the same time, the data demonstrates that pores in the hollow support fiber are at least partially plugged, because, while the selectivity exhibited by permeators whose fibers are uncoated hollow support fibers is 0.9, the selectivities exhibited by permeators whose hollow support fibers are coated with up to 0.5 wt % of the pre-coat coating composition are 7 for 0.1 wt %, 11 for 0.2 wt %, and 15 for 0.5 wt %.

Therefore, it may be reasonably concluded that the pre-coat layer of the invention plugs pores in the hollow support fiber but is not an integral layer of the type disclosed by prior art gutter layers. Moreover, despite the fact that the pre-coat layer of the invention is not an integral layer, the permeance exhibited by the pre-coated hollow support fiber overcoated with a selective layer is enhanced while at the same time exhibiting the full selectivity expected from the polymer of the selective polymer.

Comparative Example 2: Composite Membrane Fabrication and Testing of Perfluoropolymer Blend 60:40 Hyflon AD 60: Teflon AF1600 (C4) on PEEK This Comparative example describes the conventional coating of a perfluoropolymer blend (60:40) of Hyflon AD 60:Teflon AF1600 on a PEEK hollow fiber substrate. The coating solution formulation was 2% of 60:40 (w/w) Hyflon AD 60:Teflon AF1600 in a perfluoro solvent PF-5058 from 3M Company (C4 formulation). This C4 solution was coated directly on the PEEK fiber without any pre-coating. The PEEK fibers went through the first drying tower without any coating solution and then went through the second drying tower at 80° C. with C1 coating solution only. The residence time in the C1 coating bath (a beaker was used) was 3 sec. A mini-permeator with at least 10 filaments was post-treated with 0.5% Sylgard 2577 before the pure gas permeance measurements were taken.

Example 2: Composite Membrane Fabrication and Testing of a 60:40 Hyflon AD 60:Teflon AF1600 Blend (C4) with a Teflon AF2400 Precoat (P2) on PEEK This Example demonstrates an increase in permeance that is seen with the pre-coating technique of the invention where both the pre-coat and selective layers are perfluoro polymers soluble in a same solvent. The pre-coat solution was 0.2% Teflon AF 2400 in PF-5058 (formulation P2). Teflon AF 2400 is a high permeability polymer. The selective layer coating solution was the same perfluoro polymer blend (C4) dissolved in the same PF-5058 solvent as described in Comparative Example 2. The 0.2% P2 pre-coating solution was first coated on PEEK porous hollow fiber by dip coating. The pre-coated fibers were dried at 80° C. for 2 minutes and then further dried at room temperature for another 2 minutes to remove the solvent. The dried pre-coated fibers were then dip-coated in the C4 solution with a residence time of 3 sec. These P2+C4 coated fibers were also dried at 80° C. and room temperature for 2 minutes each. The resulting fibers were dried at room temperature overnight before use. A mini-permeator with at least 10 filaments was post-treated with 0.5% Sylgard 2577 before the pure gas permeance measurements were taken.

Table 5 summarizes the pure gas permeances of the Comparative Example 2 and Example 2 mini permeators at a pressure of 100 psi and at room temperature. To confirm the success of the pre-coating work, we measured the $CO_2/CH_4$ at room temperature with 100 psig through a shell feed with a 1% stage cut with a 20:80 mixture of $CO_2:CH_4$. Table 6 summarizes the $CO_2/CH_4$ mixed gas results. The significantly higher permeance with similar selectivity confirmed that the pre-coating layer is validated under practical conditions.

TABLE 5

Pure gas permeances of the Comparative Example 2 and Example 2 samples using the same solvent.

| | Gas permeance (GPU) | | Gas selectivity |
|---|---|---|---|
| | $N_2$ | $CO_2$ | $CO_2/N_2$ |
| Comparative Example 2 | 6 | 47 | 8 |
| Example 2 | 23 | 175 | 8 |
| Comparative Example 2 | 6 | 47 | 8 |
| Example 2 | 23 | 175 | 8 |

As seen in Table 5, the invention resulted in a permeance increase of 283% for N2, and 272% for $CO_2$ while at least maintaining a $CO_2/N_2$ selectivity.

TABLE 6

$CO_2/CH_4$ mixed gas measurements at room temperature, 100 PSIG, shell feed, and with a 20% $CO_2/CH_4$ mixture and a 1% stage cut.

| | Gas permeance (GPU) | | Gas selectivity |
|---|---|---|---|
| | $CO_2$ | $CH_4$ | $CO_2/CH_4$ |
| Comparative Example 2 | 43 | 3.3 | 13 |
| Example 2 | 144 | 14 | 10 |

Further experiments were done to show that the pre-coat layer in this example is not an integral gutter layer described in prior art literature. A hollow fiber support made of PEEK was pre-coated with varying concentrations of the high permeability perfluoropolymer Teflon AF 2400 in PF 5058 solvent. The pre-coated fibers were then coated with the C4 (60:40 Hyflon AD 60:Teflon AF1600 blend in the same solvent) formulation. Permeators were formed from the uncoated hollow fiber support, the pre-coated hollow fiber support, and the pre-coated hollow fiber support overcoated with the C4 selective layer. The results are shown in Table 7.

TABLE 7

Perm-selectivity of uncoated hollow fiber support, pre-coated hollow fiber support, and pre-coated (with varying concentrations of Teflon AF 2400) hollow fiber support overcoated with C4 coated fiber. Permeance and selectivity were obtained from permeators formed from the uncoated hollow fiber support, the pre-coated hollow fiber support, and the pre-coated hollow fiber support overcoated with C4.

| Pre-coat concentration of Teflon AF 2400 in PF-5058 (% wt) | Uncoated hollow fiber support | | Hollow fiber support directly overcoated with C4 selective layer | | Perm-selectivity of pre-coated (only) fiber | | Perm-selectivity of pre-coated + C4 coated fiber | |
|---|---|---|---|---|---|---|---|---|
| | $CO_2$ GPU | $CO_2/N_2$ | $CO_2$ GPU | $CO_2/N_2$ | $CO_2$ GPU | $CO_2/N_2$ | $CO_2$ GPU | $CO_2/N_2$ |
| No pre-coat | 2100 | 0.9 | 47 | 8 | | | | |
| 0.2 (P2 formulation) | | | | | 837 | 2 | 175 | 8 |
| 2 | | | | | 350 | 4.5 | | |

Similar to the data in Table 4 of Example 1, the selectivity results in Table 7 for the uncoated fibers and the fibers only coated with the pre-coat layer demonstrate that an integral pre-coat layer with full selectivity was not achieved for a pre-coat concentration of 0.2 wt % while it was achieved for a pre-coat concentration of 2 wt %. Again, the selectivity of the 2% Teflon AF2400—only coated fiber matches the intrinsic selectivity seen when testing dense films of Teflon AF2400. The perm-selectivity of pre-coated hollow support fibers overcoated with the C1 composition show that even though the pre-coat layer is not an integral gutter layer at a pre-coat concentration of 0.2 wt %, the full selectivity of the selective layer (a C4 polymer blend) is maintained.

Comparative Examples 3A & 3B: Composite Membrane Fabrication and Testing of 2% 6FDA:BPDA-DAM Formulations (C2, C3) on PEEK These Comparative examples describe conventional coating of a polyimide 6FDA:BPDA-DAM on a PEEK hollow fiber substrate. The coating solution formulation was 2% (w/w) of this polyimide in either 1,3 dioxolane (C2) to provide Comparative Example 3A or 1,4 dioxolane (C3) to provide Comparative Example 3B. These coating solutions were coated directly on the PEEK fiber without any pre-coating. The PEEK fibers went through the first drying tower without any coating solution and then through the second drying tower at 80° C. with the C1 coating solution only. The residence time in the C1 coating bath (we used a beaker) was 3 sec. Two mini permeators, one containing filaments of the C2-coated fibers and one containing filaments of the C3-coated fibers, were post-treated with 0.5% Sylgard 2577 before pure gas permeance measurements were taken.

Examples 3A & 3B: Composite Membrane Fabrication and Testing of 2% 6FDA:BPDA-DAM Formulations (C2, C3)+a Pre-Coat of 6FDA:BPDA-DAM (P1) on PEEK These Examples demonstrates an increase in permeance seen with the pre-coating technique of the invention where both the pre-coat and selective layers are the same polyimide polymer but the solvents are varied. The solvent (1, 3 dioxolane) is the same solvent used for the selective layer coating in both Comparative Example 3A and Example 3A. The solvent (1, 4 dioxolane) is the same solvent used for the selective layer coating in both Comparative Example 3B and Example 3B. In each of Examples 3A & 3B, the PEEK fibers were first pre-coated with a 0.2% solution of the high permeability polyimide 6FDA-BPDA+DAM in 1,3 dioxolane (formulation P1). In Example 3A, the pre-coated fibers were subsequently coated with the C2 (2% 6FDA:BPDA-DAM in 1, 3 dioxolane) coating solution to create the selective layer. In Example 3B, the pre-coated fibers were subsequently coated with the C3 (2% 6FDA:BPDA-DAM in 1, 3 dioxolane) coating solution to create the selective layer. The pre-coated fibers were dried at 80° C. for 2 minutes and then further dried at room temperature for another 2 minutes to remove the solvent. The dried pre-coated fibers were dip-coated in the C2 or C3 solution with a residence time of 3 sec. These P1+C2 and P1+C3 coated fibers were also dried at 80° C. and room temperature for 2 minutes, respectively. The resulting fibers were dried at room temperature overnight before use. Two mini-permeators, one containing P1+C2 coated filaments and one containing P1+C3 coated filaments, were post-treated with 0.5% Sylgard 2577 before pure gas permeance measurements were taken. Table 8 summarizes the pure gas permeances of the Comparative Example 3A (C2) and Comparative Example 3B (C3) mini permeators and of the Example 3A (C2/P1 and Example 3B (C3/P1) mini permeators at a pressure of 100 psi and at room temperature.

TABLE 8

Pure gas permeance of samples coating with same materials.

|  | Gas permeance (GPU) | | Gas selectivity |
| --- | --- | --- | --- |
|  | $N_2$ | $CO_2$ | $CO_2/N_2$ |
| Comparative Example 3A | 0.41 | 13 | 32 |
| Example 3A | 2 | 42 | 28 |
| Comparative Example 3B | 0.65 | 15 | 23 |
| Example 3B | 1.1 | 26 | 24 |
| Comparative Example 3A | 0.41 | 13 | 32 |
| Example 3A | 2 | 42 | 28 |
| Comparative Example 3B | 0.65 | 15 | 23 |
| Example 3B | 1.1 | 26 | 24 |

As seen in Table 8, the invention resulted in substantial permeance increases He, N2, and $CO_2$ while at least maintaining a $CO_2/N_2$ selectivity.

Figure 2:
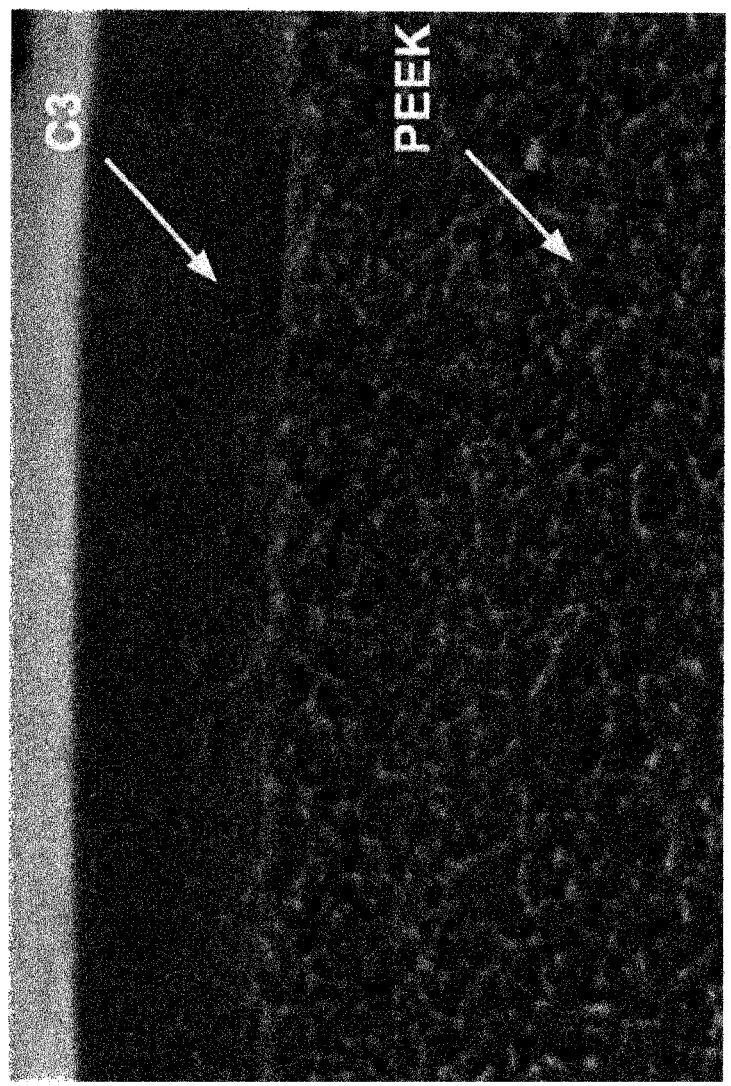
FIG. 2 is a SEM image of a fiber from Comparative Example 3B.
Figure 3:
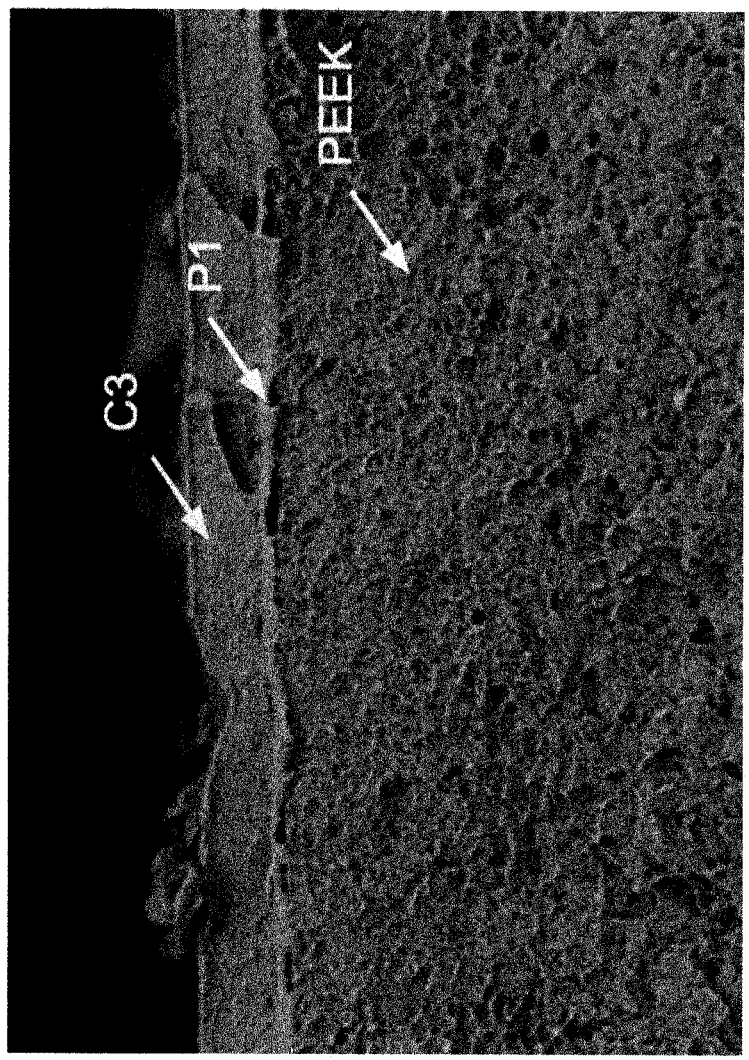
FIG. 3 is a SEM image of a fiber from Example 3B.
Figure 4:
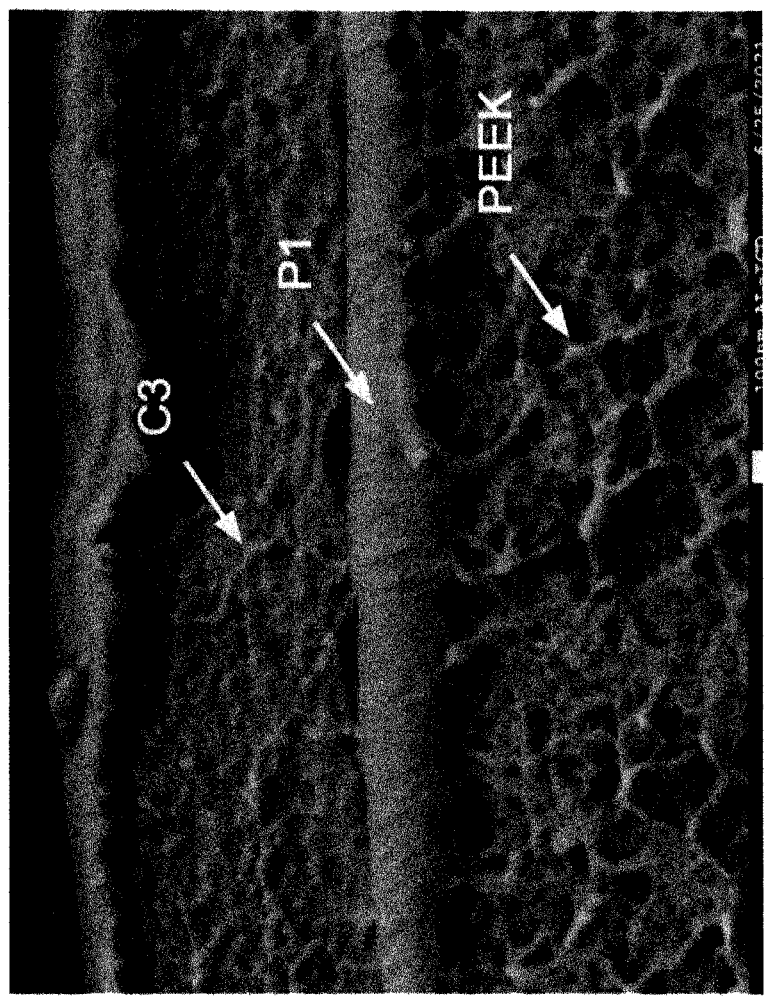
FIG. 4 is a SEM image of a fiber from Example 3B at higher magnification than FIG. 3.

FIGS. 2-4 show SEM images of the Comparative Example 3B and Example 3B fibers. FIG. 2 (with a 1 um scale bar) shows the direct C3 coating on a PEEK porous substrate of Comparative Example 3B. The similar magnification image of FIG. 3 shows the C3 coating on top of a P1 precoat on the same PEEK substrate of Example 3B. The existence of the P1 precoat layer is further confirmed in FIG. 4 (with a higher magnification with a 100 nm scale bar) of the same C3/P1 coated fiber in which a thin layer of P1 pre-coating layer is observed to be deposited on PEEK. The FIGS. 2-4 images show that the P1 precoat successfully prevents the C3 coating solution from diffusing into the PEEK substrate because the PEEK structure remains open. It also shows that even with the same coating solvents, the P1 layer was not dissolved by the C3 coating process in the second step.

Comparative Example 4: Composite Membrane Fabrication and Testing of Hyflon AD 60 (C5) on PEEK This Comparative example describes the conventional coating of a perfluoropolymer Hyflon AD 60 on a PEEK hollow fiber substrate. The coating solution formulation was 2% (w/w) Hyflon AD 60 in a perfluoro solvent PF-5058 from 3M Company (C5 formulation). This C5 solution was coated directly on the PEEK fiber without any pre-coating. The PEEK fibers went through the first drying tower without any coating solution and went through the second drying tower at 80° C. with the C1 coating solution only. The residence time in the C1 coating bath (a beaker was used) was 3 sec. Mini permeators containing the Comparative Example filaments were produced by the same method as previous Examples.

Example 4: Composite Membrane Fabrication and Testing of 2% Hyflon AD60 (C5) with Perfluoro Teflon AF2400 Precoat (P2) on PEEK The procedure of Comparative Example 4 was duplicated except that the C5 is used for coating solution while P2 is used for pre-coating solution. Thus, the PEEK fibers went through the first drying tower with the P2 coating and through the second drying tower with the C5 coating. The performance of composite fiber coated in this manner can be compared with that of Comparative Example 4 where C5 is directly coated on the same PEEK fiber. Example 4 demonstrates fiber composite performance with improved permeance as well higher selectivity of the top coating layer. It also demonstrates a selectivity advantage over Comparative Example 2 where the coating layer is a 60:40 blend of Hyflon AD60:Teflon AF1600 (C4). Mini permeators containing the Example 4 filaments was produced by the same method as previous Examples. Table 9 summarizes the pure gas permeances of the mini permeators containing the C5 coated filaments and the mini permeators containing the C5/P2 coated filaments at a pressure of 100 psi and at room temperature.

TABLE 9

Pure gas permeances of fibers from Comparative Examples 2 and 4 with Example 4. Coating materials are based on Hyflon AD60 and Teflon AF 1600.

|  | Gas permeance (GPU) | Gas selectivity | |
| --- | --- | --- | --- |
|  | $CO_2$ | $CO_2/N_2$ | $CO_2/CH_4$ |
| Comparative example 4: Hyflon AD60 (C5) on PEEK | 53 | 5 | 5.0 |
| Comparative example 2: 60:40 blend of Hyflon AD60:Teflon AF1600 (C4) on PEEK | 47 | 8 | 11 |
| Example 4: Hyflon AD60 (C5) on Tef AF2400 (P2) precoated PEEK | 182 | 7 | 16 |

The invention provides several advantages.

The composite hollow fiber membranes of the invention offers a tremendously wider variety of pairs of pre-coat polymers and selective layer polymers than are offered by conventional composite hollow fiber membranes. Because it is no longer necessary to use dissimilar solvents for the pre-coat and selective layers, it is no longer necessary to use chemically dissimilar polymeric materials for the pre-coat and selective layers.

The composite hollow fiber membranes of the invention do not experience the unsatisfactory delamination of the gutter and selective layers from one another that is often experienced in conventional composite hollow fiber membranes utilizing chemically dissimilar materials for the gutter and selective layers. Because the pre-coat and selective layers of the invention are chemically similar, we avoid such delamination problems.

The composite hollow fiber membranes of the invention do not require the crosslinking of a gutter layer often required by conventional composite hollow fiber membranes and thus do not require the associated equipment and chemistry complexities during the manufacturing process Rather, the manufacturing process of the invention is much simpler in comparison.

In contrast to U.S. Pat. No. 4,602,922, in spite of a solvent for application of the selective layer that is also a solvent for the polymeric material of the pre-coat layer, coating, we prevent damage to the pre-coat layer by controlling the kinetics of the coating/drying process and/or the relatively solubilization kinetics offered by a relatively higher molecular weight of the polymeric material of the pre-coat.

In contrast to U.S. Pat. No. 5,286,280, we may use utilize the same or similar polymeric materials and/or the same or very similar solvents for the pre-coat and selective layers. This avoids the surface tension, non-uniform coating coverage, and adhesion problems that are experienced by many conventional composite hollow fiber membranes. For example, if the gutter layer is formed from a perfluoropolymer such as Teflon AF, selective layer coating solutions utilizing non-fluorinated solvents do not spread well, resulting in non-uniform and non-integral coatings. While cross-linked silicone is frequently recommended as a gutter layer on account of its high permeability and solvent resistance, its adhesion to many polymers is poor and results in delamination of the gutter and selective layers during use or even during processing. The coating method of this invention prevents these issues by allowing the use of a wider range of polymers and solvents that overcome these non-compatibilities.

In contrast to U.S. Pat. No. 10,596,527, we may use the same or very similar solvents and the same or chemically similar polymeric materials for both the pre-coat and selective layers and rely on the pre-coat layer drying kinetics to prevent stripping of the pre-coat layer.

In one embodiment in which the polymer of the pre-coat coating composition is present at a concentration of 0.5 wt % or less, the composite hollow fiber membranes of the invention do not have an integral gutter layer with few defects as described by Kattula, et al. "Designing ultrathin film composite membranes: the impact of a gutter layer", Sci Rep 5, 15016 (2015). Because the hollow fiber support is pre-coated with a coating composition having a relatively low polymer concentration (i.e., <0.50 wt %), a non-integral pre-coat layer with less than intrinsic gas selectivity (of an integral film of the pre-coat polymer) is formed. While not being bound by the explanation below, we believe that the pre-coat can act to reduce the constriction resistance (i.e., in the non-linear diffusion path above the substrate) and also by prefilling the substrate pores with the high permeability pre-coat polymer. Prefilling prevents the lower permeability polymer of the selective layer coating composition from filling these pores. Because these pores are filled with the high-permeability polymer of the pre-coat layer composition instead of the low-permeability polymer of the selective layer composition, the overall permeance of the inventive is increased in comparison to those formed without the inventive pre-coat layer. Tables 4 and 7 from Examples 1 and 2 show that, even though the pre-coat layer is not an integral layer, the method of this invention produces membranes that exhibit full selectivity (with the aforementioned enhanced permeance) in comparison to hollow fiber supports that are directly coated with the selective layer without the pre-coat layer. For example the highly effective Teflon AF 2400 pre-coat formulation (P2 in Table 1) has a $CO_2/N_2$ selectivity of only 2, whereas higher concentration coatings of Teflon AF 2400 give $CO_2/N_2$ selectivity ~4.5 in line with the intrinsic selectivity measured on stand-alone Teflon AF 2400 dense films. This lower selectivity observed with pre-coat layer coated from a low solids pre-coat coating composition demonstrates that the precoat layer is non-integral. This may be contrasted with the gutter layers of the state of the art which are integral layers.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as tall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for manufacturing a composite hollow fiber membrane with improved permeance and separation layer adhesion, comprising the steps of:
   providing a hollow fiber membrane support;
   dipping the hollow fiber membrane support in a precoat layer coating composition that comprises a first polymer dissolved in a first solvent to thereby provide a pre-coated hollow fiber membrane support;
   drying the pre-coated hollow fiber membrane support to thereby provide a dried pre-coated hollow fiber membrane support having a non-integral pre-coat layer; and
   dipping the dried pre-coated hollow fiber membrane support in a selective layer coating composition that comprises a second polymer dissolved in a second solvent to thereby provide the composite hollow fiber membrane with improved permeance and separation layer adhesion, wherein:
   in between the dipping of the hollow fiber membrane support in the precoating layer coating composition and the dipping of the dried pre-coated hollow fiber membrane support, the dried precoating layer coating composition is not cross-linked,
   the first and second polymers are the same or different,
   each of said first and second polymers is at least 1 wt % soluble in a same third solvent,
   the first and second solvents are the same or different,
   the first and third solvents are the same or different,
   the second and third solvent are the same or different, and
   wherein the first polymer is present in the precoat layer coating composition at a concentration of no more than 0.50 wt %.

2. The method of claim 1, wherein the first and second solvents are miscible in one another.

3. The method of claim 1, wherein the first and second polymers are the same polymer and the first and second solvents are the same.

4. The method of claim 1, wherein the first and second polymers are the same polymer and the first solvent is different from the second solvent.

5. The method of claim 1, wherein the first polymer is different from the second polymer and the first and second solvents are the same.

6. The method of claim 1, wherein the first polymer is different from the second polymer and the first solvent is different from the second solvent.

7. The method of claim 1, wherein the hollow fiber membrane support is comprised of a material selected from polyether ketone (PEK) and polyether ether ketone (PEEK).

8. The method of claim 1, wherein said steps of dipping the hollow fiber membrane support, drying the pre-coated hollow fiber membrane support, and dipping the dried pre-coated hollow fiber membrane support are performed continuously.

9. The method of claim 1, wherein said step of drying the pre-coated hollow fiber membrane support is performed by traversing the pre-coated hollow fiber membrane support through a drying tower through which a drying gas flows at a temperature of 30-180° C.

10. The method of claim 1, wherein the first polymer is selected from polyimides, perfluorinated polymers, polymers of intrinsic morphology (PIMs), substituted polyacetylenes, and polyether-block-copolymers.

11. The method of claim 10, wherein the first polymer is selected from: copolymers of 2,2'-Bis-(3,4-Dicarboxyphenyl) hexafluoropropane dianhydride and 2,3,5,6-tetramethyl-phenylene diamine; copolymers of the dianhydrides 2,2'-Bis-(3,4-Dicarboxyphenyl) hexafluoropropane dianhydride and 3,3',4,4'-Biphenyl tetracarboxylic dianhydride and 2,4.6-trimethyl-I,3-phenylene diamine; copolymers of 2,2-bis-trifluoromethyl-4,5-difluoro-1,3-dioxole and tetrafluoroethylene, polyether block-amide copolymers, polytrimethyl silyl propyne, and polymethyl pentene.

12. The method of claim 1, wherein the second polymer is selected from polyimides, perfluoropolymers, sulfonated polysulfone, polycarbonates, polypyrroles, polymers of intrinsic microporosity, and polyether-block copolymers.

13. The method of claim 12, wherein the second polymer is selected from poly(tetrafluoroethylene-co-2,2,4-trifluoro-5-trifluorom ethoxy-1,3-dioxole) and poly(perfluoro-4-vinyloxy-1-butene).

14. The method of claim 1, wherein immediately after said step of dipping the dried pre-coated hollow fiber membrane support is performed, the composite hollow fiber membrane is dried traversing it through a drying tower through which a drying gas flows at a temperature of 30-180° C.

15. The method of claim 1, wherein a residence time of the dried pre-coated hollow fiber membrane support in the selective layer coating composition is 0.2-5.0 sec.

16. The method of claim 1, wherein a residence time of the dried pre-coated hollow fiber membrane support in the selective layer coating composition is 1-4 sec.

17. The method of claim 1, wherein the first and second polymers are the same polymer except that a molecular weight of the first polymer is greater than a molecular weight of the second polymer.

18. The method of claim 1, wherein the second polymer is at least 1 wt % soluble in the first solvent.

19. The method of claim 1, wherein the first polymer is at least 1 wt % soluble in the second solvent.

20. The composite hollow fiber membrane produced by the method of claim 1.

\* \* \* \* \*